Nov. 28, 1950     M. GERUM     2,531,422
LOGGING HOOK
Filed Dec. 22, 1945
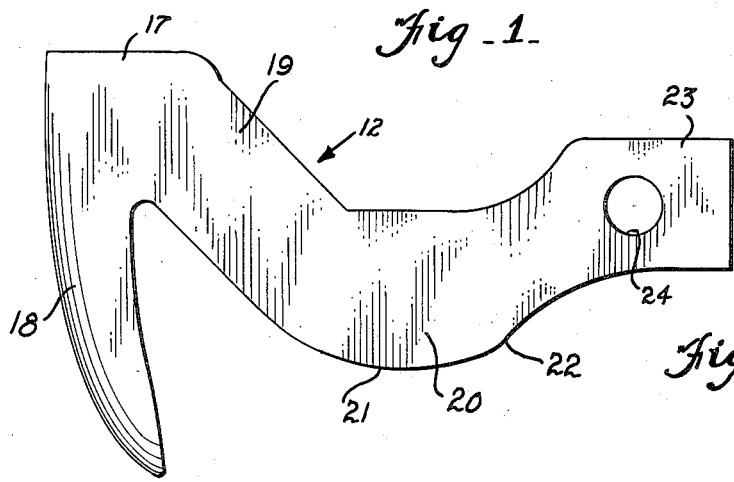
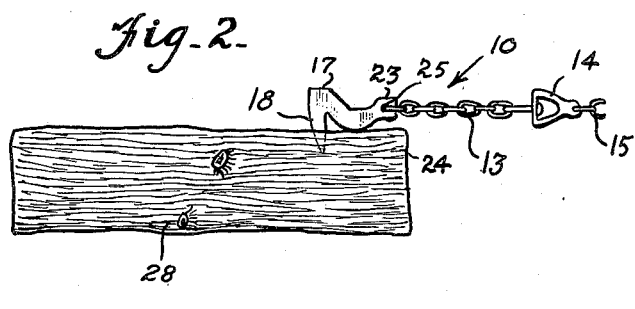
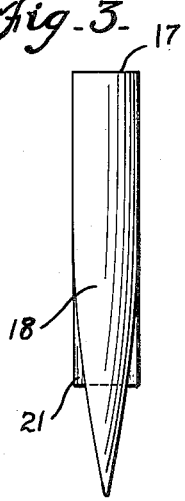
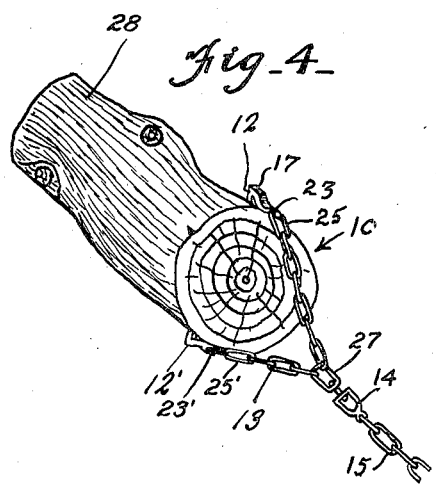
Inventor
Max Gerum
By Clarence A. O'Brien
and Harvey B. Jacobson
Attorneys Patented Nov. 28, 1950

2,531,422

UNITED STATES PATENT OFFICE 2,531,422

LOGGING HOOK

Max Gerum, Jamaica, N. Y.

Application December 22, 1945, Serial No. 636,842

2 Claims. (Cl. 294—82)

The invention as described herein, and illustrated in the accompanying drawings, consists of a pair of logging hooks, an object of which is to provide such hooks so formed that they may be instantly released with a single blow regardless of their position.

Another object of the invention is to provide a hook having a bill head and an anvil connected by an arcuate or bellied shank.

A further object of this invention is to provide a hook having a bill head and a releasing anvil, the head being so arranged as to provide a protection for the anvil.

Another object of the invention is to provide a pair of twin hooks connected by a chain having a central swivel connected thereto, the combination being so arranged that when the chain is held taut by another chain connected to the swivel both hooks may be released with a single blow of a sledge hammer.

Other features and advantages will become more readily apparent from the following description and the accompanying illustrative drawings in which:

Figure 1 is an elevational view of a log hook,

Figure 2 is an elevational view illustrating an application of the hook,

Figure 3 is an end view of the hook, and

Figure 4 is a perspective view of the invention shown applied to a log.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility if the invention it remains obvious that it may be employed in any other capacity wherein it may be found applicable.

In the accompanying drawings, and in the following specification, the same reference characters are used to designate the same parts and elements throughout and in which 10 refers to the invention and 12, indicates one of a pair of hooks 12 and 12', connected by a chain 13, to the center of which is connected a swivel 14, for connection with a logging chain 15. Both of the hooks 12 and 12' are identical in form and therefore it will be necessary only to specifically describe one thereof.

The hook 12 has projecting from its flat head 17, a downwardly projecting bill 18, which is somewhat inwardly curved. Integral with said head 17, is a shank 19, which inclines down to a belly 20, the lower surface of which is arcuate to form a rocker 21, and from the rear 22 of the rocker the shank extends up to provide a raised anvil 23, which is considerably above the rocker, but still below the common horizontal plane of the head 17, whereby the anvil is guarded from accidental blows, by said head. The anvil end 23, of the shank 19, is provided with a transverse bore 24, to which is fixed an end 25, of the chain 13, the other end 25', of which is fixed to the end 23', of the twin hook 12'. To the center 27, of the chain 13, is secured the swivel 14.

From the foregoing it will be seen that I have provided a log hook so formed that a direct blow upon the flat top of the free end of the shank of the hook will withdraw the bill of the hook from the log through the action of the rocker 21, intermediate the bill and said free end. It will also be seen that when the chain 15, drawn taut by a tractor from which it is desired to release the log is struck a blow at the point of the swivel 14, that the chain 13, will re-act to draw both ends 23 and 23', of the twin hooks out of the surface 24 of a log 28, thus with one blow releasing both hooks.

The function of the swivel 14, is an important element in the invention as due to the same the log 28, may freely rotate, that is, roll about (as always occurs in dragging logs) without twisting the chain 13 upon itself, which twisting action would draw in upon the shank ends 23 and 23' and thus release the hooks from the log.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. A device comprising a log hook having a log-engaging bill, an eye for attachment of a chain, and a shank with a fulcrum between said bill and said eye, said fulcrum being in the form of a rocker, a raised anvil portion beyond the rocker, said eye being in said anvil portion, a chain connecting a twin hook with the first-mentioned hook, a swivel located centrally of the chain and another chain connected to the swivel, said bill of the hook having a flat head, said head forming a guard for the anvil, and the anvil being on a lower plane than said head whereby in use the anvil portion will be spaced from a log when the bill is fully engaged with the log and a single transversely directed blow on one of said chains adjacent said swivel, when said chains are tautened with the swivel spaced from the end of said log, will be transmitted directly to the anvil portion of one of said hooks to disengage this hook, and the other of said hooks will be disengaged due to the subsequent whipping action of the chains.

2. A device comprising a log hook having a log-engaging bill, an eye for attachment of a chain, and a shank with a fulcrum between said bill and said eye, said fulcrum being in the form of a rocker, a raised anvil portion beyond the rocker, said eye being in said anvil portion, a chain connecting a twin hook with the first-mentioned hook, a swivel located centrally of the chain and another chain connected to the swivel, said bill of the hook having a flat head, said head forming a guard for the anvil.

MAX GERUM.

REFERENCES CITED

The following references are of record in the file of this patent:

UNITED STATES PATENTS

| Number | Name | Date |
|---|---|---|
| 67,375 | Sykes | July 30, 1867 |
| 876,652 | Martin | Jan. 14, 1908 |
| 1,247,194 | White | Nov. 20, 1917 |
| 1,548,209 | Rounds | Aug. 4, 1925 |
| 2,372,724 | Kerstetter | Apr. 3, 1945 |
| 2,397,660 | Hansen | Apr. 2, 1946 |